(12) United States Patent
Majid et al.

(10) Patent No.: US 10,659,897 B2
(45) Date of Patent: *May 19, 2020

(54) COMPUTER-IMPLEMENTED METHOD FOR REDUCING CROSSTALK IN A COMPUTER-BASED AUDIOMETER

(71) Applicant: SHOEBOX Ltd., Ottawa (CA)

(72) Inventors: Michael Majid, Nepean (CA); Julian Bromwich, Ottawa (CA); Heikki Koivikko, Ottawa (CA)

(73) Assignee: SHOEBOX Ltd., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,254

(22) Filed: Apr. 11, 2018

(65) Prior Publication Data

US 2018/0302733 A1    Oct. 18, 2018

(30) Foreign Application Priority Data

Apr. 13, 2017 (CA) ...................................... 2964247

(51) Int. Cl.
*H04S 1/00* (2006.01)
*H04B 3/32* (2006.01)
(Continued)

(52) U.S. Cl.
CPC .............. *H04S 1/005* (2013.01); *H04B 3/32* (2013.01); *H04R 5/04* (2013.01); *H04R 5/033* (2013.01);
(Continued)

(58) Field of Classification Search
CPC . H04R 3/14; H04R 25/70; H04R 5/04; H04R 5/033; G10K 11/178; H03G 3/32;
(Continued)

(56) References Cited

U.S. PATENT DOCUMENTS 3,974,453 A     8/1976   Ohsawa
4,495,637 A *   1/1985   Bruney ................... H04S 1/002
                                                  381/1
(Continued)

OTHER PUBLICATIONS

ANSI/ASA S3.6-2010 Standard for Audiometers.
(Continued)

*Primary Examiner* — Davetta W Goins
*Assistant Examiner* — Kuassi A Ganmavo
(74) *Attorney, Agent, or Firm* — Frost Brown Todd LLC

(57) ABSTRACT

A computer-implemented method for reducing undesired crosstalk signals on an inactive channel of a device comprising the steps of: (i) determining system volume levels required to achieve a range of desired audio output attenuation levels on an active channel of the device; (ii) determining a crosstalk compensation signal comprising a signal amplitude and associated phase shift required to reduce undesired crosstalk on the inactive channel of the device for each desired audio output attention level in the range of desired audio output attenuation levels; and (iii) generating a desired audio output attenuation level on the active channel of the device by generating a signal at the determined system volume level required to achieve said desired audio output attenuation level, and generating a contemporaneous crosstalk compensation signal on the inactive channel of the device by generating a signal at the determined signal amplitude and associated phase shift required to reduce the undesired crosstalk on the inactive channel.

13 Claims, 11 Drawing Sheets

(51) Int. Cl.
*H04R 5/04* (2006.01)
*H04R 5/033* (2006.01)

(52) U.S. Cl.
CPC ....... *H04S 2400/01* (2013.01); *H04S 2420/01* (2013.01)

(58) Field of Classification Search
CPC ....... A61B 5/12; H04S 1/005; H04S 2400/01; H04S 2420/01; H04B 3/32
See application file for complete search history.

(56) References Cited

U.S. PATENT DOCUMENTS

| | | | | |
|---|---|---|---|---|
| 8,543,209 | B2 | 9/2013 | Tyers et al. | |
| 9,339,216 | B2 | 5/2016 | Fausti et al. | |
| 2009/0052678 | A1* | 2/2009 | Cheng | H04R 29/001 381/58 |
| 2009/0086982 | A1* | 4/2009 | Kulkarni | H04R 5/04 381/1 |
| 2009/0090165 | A1* | 4/2009 | Mayou | A61B 5/121 73/1.82 |
| 2010/0027799 | A1* | 2/2010 | Romesburg | H04R 5/04 381/28 |
| 2011/0305346 | A1* | 12/2011 | Daubigny | H03G 3/32 381/28 |
| 2013/0156238 | A1* | 6/2013 | Birch | H03F 3/181 381/309 |
| 2013/0274628 | A1* | 10/2013 | Fausti | A61B 5/123 600/559 |
| 2014/0093109 | A1* | 4/2014 | Bazarjani | H04R 5/04 381/309 |
| 2017/0180859 | A1* | 6/2017 | Lesso | H04R 3/12 |

OTHER PUBLICATIONS

Jacobs, et al., "Development and Evaluation of a Portable Audiometer for High-Frequeney Screening of Hearing Loss from Ototoxicity in Homes/Clinics," IEEE Transactions on Biomedical Engineering, Nov. 2012, 59(11):3097-3103.
Canadian Office Action dated Apr. 29, 2019 for Application No. CA 3,000,433.
International Search Report and Written Opinion, with Search Strategy, dated Dec. 30, 2016 for Application No. PCT/CA2016/000249.

* cited by examiner

Graphical depiction showing crosstalk in a system where channels
are not fully isolated

**Audible crosstalk occurs when power leaks from one channel
to the other in systems where channels are not fully isolated.**

Pseudocode to create 1 second of samples to produce a sine wave

```
constant SAMPLE_RATE = 44100;

generateSamples(frequency, amplitude, phase) {
   for interval = 0; interval < SAMPLE_RATE; interval++ {
      var time = frequency / SAMPLE_RATE * interval;
      samples[interval] =
         amplitude * sin( 2 * pi * frequency * time + phase);
   }
   return samples;
}
```

Figure 3

A graphical depiction of the affect of independently and collectively adjusting System Volume (v) and Signal Amplitude (a)

(Data shown is for an Apple iPad)

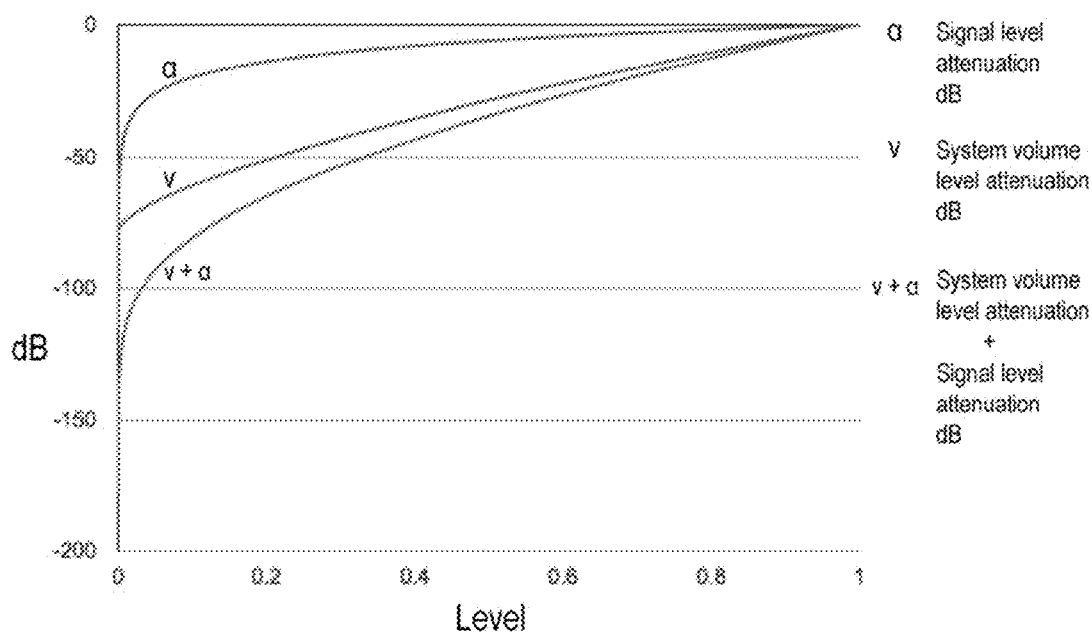

Note 1: The top two lines show "independent" adjustment, so for v = 1 for the 'a' line, and a = 1 for the 'v' line.

Note 2: "Level" means System Volume Level for the 'v' plot, and means Signal Amplitude for the 'a' plot.

Note 3: The 'v+a' plot is simply the sum of the 'v' and 'a' plots to demonstrate that a broad decibel range can only be achieved by controlling both 'v' and 'a'.

Figure 4

Example SystemVolumeAttenuation (SVA) table mapping System Volume to Audio Voltage Attenuation.

| Index | System Volume Level | mV rms | Audio Voltage Attenuation (dB) |
|---|---|---|---|
| 0 | 1.00 or 16/16 | 943 | 0.00 |
| 1 | 0.56 or 9/16 | 52 | -25.17 |

Note 1: "System Volume Level" can be indexed in any convenient manner, such as a decimal value (ie. 0.56), a fractional value (ie. 9/16), an index (ie. 9), or any other convenient representation of the system volume level.

Note 2: A column for "mV rms" is shown in the above table to assist in explanation, but it is not necessary to actually store this column in the database. The "Index" column is also not necessary to store in the database and is included here to assist in the explanation.

Figure 5

Pseudocode to query the system volume level and calculate the signal amplitude for producing a sound at the given target attenuation.

Note: SVA is an abbreviation for "SystemVolumeAttenuation" from Figure 5.

```
func calculateOutputLevel(targetAttenuation) {
    var index = findSVAIndex(targetAttenuation);
    /* Calculate how much we need to attenuate the signal by
        in order to achieve the targetAttenuation. */
    signalLevelAttenuation =
        targetAttenuation - SVA[index].audioVoltageAttenuation;
    amplitude = decibelstoAmplitude(signalLevelAttenuation);
    return { SVA[index].systemVolumeLevel, amplitude }
} func findSVAIndex(targetAttenuation) {
    for (index = 1; index < SVA.size; index ++) {
        if (targetAttenuation > SVA[index].audioVoltageAttenuation) {
            /* This audioVoltageAttenuation would reduce volume by
                too much so return index -1 (which is less attenuation) */
            return (index - 1);
        }
    }
    return SVA.size - 1;
}
```

Figure 6

Pseudocode to use the system volume level and Amplitude values
(from Figure 6) to generate the waveform samples.

```
system.setVolumeLevel( systemVolumeLevel );
generateSamples(frequency, amplitude, phase);    // See Figure 3
```

Figure 7

Note: In systems that we've tested, the bulk of crosstalk is either very near 0 degrees or very near 180 degrees of phase to the active channel.  The above visualizes crosstalk manifesting at 180 degrees.

Method to determine crosstalk compensation parameters

For a particular transducer impedance, System Volume Level, and frequency, iteratively approach the optimal Crosstalk Amplitude Offset and Phase Offset to produce a cross talk-compensation signal that best eliminates the measured crosstalk.

Crosstalk Compensation Parameters ("CCP") table

| Indexes | | Crosstalk Compensation Parameters | |
|---|---|---|---|
| Frequency | System Volume Level | Crosstalk Amplitude Offset (dB) | Phase Offset (Radians) |
| 125 | 1.0  (ie. 0dB) | -63.48 | 0.005 |
| 125 | 0.56 (ie. -25dB) | -57.55 | 3.142 |
| 250 | 1.0 | -63.48 | 0.002 |
| 250 | 0.56 | -57.55 | 3.142 |
| ... | ... | ... | ... |

AmplitudeComp = AmplitudeSignal + CrosstalkAmplitudeOffset
PhaseComp = PhaseSignal + PhaseOffset

Note 1: An instance of the above CCP structure is required for each impedance level, with interpolation used between tables to cover missing impedance values.

Note 2: Alternative structures to the above are also convenient. One example is to index by Impedance level. In that case, interpolation between neighbouring rows can be used for missing impedance values. The crosstalk compensation parameters are stored only for a particular frequency (say 1KHz), and values for other frequencies are calculated on the fly. This is possible because the Phase Offset doubles with each increase in octave, and halves with each decrease in octave. (Crosstalk Amplitude Offset is not affected by frequency).

Figure 10

COMPUTER-IMPLEMENTED METHOD FOR REDUCING CROSSTALK IN A COMPUTER-BASED AUDIOMETER

FIELD OF THE INVENTION

The present invention relates to a method for reducing "crosstalk", the unwanted transmission of signals between communication channels, in an audiometer. In particular, the present invention relates to a computer-implemented method for reducing crosstalk in a computer-based audiometer.

BACKGROUND OF THE INVENTION

Crosstalk, the unwanted transmission of signals between communication channels, in the context of hearing testing means that an unwanted audible signal is present on the inactive channel. ANSI/ASA S3.6-2010 regulates the maximum allowable levels of crosstalk for a compliant audiometer. Crosstalk occurs when power leaks from one channel to the other in systems where channels are not fully isolated (see FIG. 1).

While purpose-built audiometers meet this standard through the use of hardware designed to electrically isolate the left and right channels, a software audiometer running on a computer or mobile device needs to take extra steps in order to meet the standard. A common approach is to augment the computer or mobile device with external hardware, usually called a DAC, that is custom-designed to generate sound in accordance with the ANSI standard.

In our invention disclosed in International patent application no. PCT/CA2016/000249 filed Oct. 6, 2016, however, we disclosed a novel method of implementing a crosstalk-compensation system entirely through the use of novel software.

In particular, we disclosed a novel computer-implemented method for reducing undesired crosstalk signals on an inactive channel of a device. That method is effective but fairly complex and can involve steps including: (a) determining system volume levels and associated signal amplitudes required to achieve a range of desired audio output attenuation levels on an active channel of the device by (i) measuring an output level at each system volume level of the device from maximum level to minimum level when the associated signal amplitude is set at 1; (ii) converting the output level at each such system volume level into decibels of attenuation; (iii) storing the decibels of attenuation for each system volume level in a database; (iv) querying the database to find the system volume level that attenuates the output level to as close to, but not more than, the desired audio output attenuation level; (v) calculating an attenuation required on the signal amplitude, which when added to the decibel of attenuation achieved at the system volume level, will result in producing the desired audio output attenuation level; (vi) storing the calculated attenuation required on the signal amplitude in the database; and (vii) repeating steps (iv) to (vi) for all system volume levels in the database; (b) determining a crosstalk compensation signal comprising a signal amplitude and associated phase shift required to reduce undesired crosstalk on the inactive channel of the device for each desired audio output attention level in the range of desired audio output attenuation levels by (viii) generating a tone for the desired audio output attenuation level by controlling the system volume level and associated signal amplitude required to generate the tone; (ix) measuring the undesired crosstalk on the inactive channel of the device; (x) calculating a signal amplitude that would be required to eliminate the undesired crosstalk on the inactive channel without modifying the system volume level; (xi) generating a candidate crosstalk compensation signal at a phase of 180 degrees in accordance with step (x); (xii) re-measuring the undesired crosstalk and iteratively adjusting the associated signal amplitude until the measured undesired crosstalk is minimized; (xiii) generating a candidate crosstalk compensation signal at a phase of 0 degrees in accordance with step (x); (xiv) re-measuring the undesired crosstalk and iteratively adjusting the associated signal amplitude until the measured crosstalk is minimized; and (xv) comparing the candidate crosstalk compensation signal at a phase of 180 degrees to the candidate crosstalk compensation signal at a phase of 0 degrees to determine which compensation signal is more effective at reducing the undesired crosstalk, and storing the signal amplitude and phase of the more effective crosstalk cancellation signal in a database; and (c) generating a desired audio output attenuation level on the active channel of the device by querying the database for the system volume level and associated signal amplitude and generating a signal at the determined system volume level and associated signal amplitude required to achieve the desired audio output attenuation level, and generating a contemporaneous crosstalk compensation signal on the inactive channel of the device by querying the database for the signal amplitude and phase and generating a signal at the determined signal amplitude and associated phase shift required to reduce the undesired crosstalk on the inactive channel.

In the present invention, we describe a new and less complex method of implementing a crosstalk-compensation system entirely through the use of novel software that allows for the use of audio hardware that does not fully isolate the left and right channels. In addition, through the teachings of the present invention, it is also possible to build equivalent external hardware that is designed to remove crosstalk from an audio system using the same basic novel technique as described herein.

SUMMARY OF THE INVENTION

The crosstalk compensation system of the present invention is capable of handling nonlinear or even completely unpredictable crosstalk with a varying signal phase. Purpose-built audiometer hardware doesn't need anti-crosstalk algorithms because the hardware is designed in such a way as to avoid crosstalk. For computer-based audiometers built on a generic platform, such as a PC, Mac, iOS or Android device however, the hardware has typically not been designed to minimize crosstalk to within ANSI standards, which leads to the need for the present software-based crosstalk compensation technique.

The method of the present invention is not the same as active-noise-cancellation which relies on a feedback loop driven by directly sampling the sound to be cancelled. For generic mobile platforms there is no direct access to sampling the undesired sound so it is necessary to predictively cancel the sound rather than reactively cancel it. Cross-talk shape varies depending on the amplifier design impedance of the driving transducer, system volume level, signal amplitude, frequency, and phase. There is no single shape for the crosstalk signal that will globally cancel crosstalk. The solution of the present invention describes how to determine the effect of certain variables, and calculate the effect of the remaining variables in the system in order to compensate for crosstalk.

In one embodiment, the present invention provides a computer-implemented method for reducing undesired crosstalk signals on an inactive channel of a device (such as a computer-based audiometer having channels that are not fully isolated) comprising the steps of: (i) determining system volume levels required to achieve a range of desired audio output attenuation levels on an active channel of the device; (ii) determining a crosstalk compensation signal comprising a signal amplitude and associated phase shift required to reduce undesired crosstalk on the inactive channel of the device for each desired audio output attention level in the range of desired audio output attenuation levels; and (iii) generating a desired audio output attenuation level on the active channel of the device by generating a signal at the determined system volume level required to achieve said desired audio output attenuation level, and generating a contemporaneous crosstalk compensation signal on the inactive channel of the device by generating a signal at the determined signal amplitude and associated phase shift required to reduce the undesired crosstalk on the inactive channel.

The step of determining system volume levels required to achieve the range of desired audio output attenuation levels on the active channel of the device may comprise the steps of: (i) measuring an output level at each system volume level of the device when signal amplitude is set at 1; (ii) converting the output level at each such system volume level into decibels of attenuation; and (iii) storing the decibels of attenuation for each system volume level in a database.

The step of determining the crosstalk compensation signal comprising the signal amplitude and associated phase shift required to reduce undesired crosstalk on the inactive channel of the device for each desired audio output attention level in the range of desired audio output attenuation levels may comprise the steps of: (i) generating a tone for the desired audio output attenuation level by controlling and setting the system volume level required to generate said tone; (ii) measuring the undesired crosstalk on the inactive channel of the device; (iii) selecting an initial Crosstalk Amplitude Offset and Phase Offset that would generate a signal equal in amplitude and opposite in phase to the measured crosstalk at the system volume level; (iv) re-measuring the undesired crosstalk on the inactive channel of the device and iteratively adjusting the Crosstalk Amplitude Offset and Phase Offset until the re-measured undesired crosstalk is minimized; and (v) storing the Crosstalk Amplitude Offset and Phase Offset that resulted in the minimized re-measured undesired crosstalk in a database.

The step of generating the desired audio output attenuation level on the active channel of the device may comprise querying the database for the system volume level to use, and the step of generating the contemporaneous crosstalk compensation signal on the inactive channel of the device may comprise querying the database for the Crosstalk Amplitude Offset and Phase Offset required to generate said crosstalk compensation signal. The database that is queried for the Crosstalk Amplitude Offset and Phase Offset may be indexed by impedance value of the active channel. Moreover, the step of generating the contemporaneous crosstalk compensation signal may comprise interpolating between impedance values to determine an appropriate Crosstalk Amplitude Offset and Phase Offset. Also, the step of generating the contemporaneous crosstalk compensation signal on the inactive channel of the device may comprise querying the database for the Crosstalk Amplitude Offset and Phase Offset for a particular frequency, and then doubling or halving the Phase Offset for each octave deviance from the frequency.

In another embodiment, the present invention provides a computer program product comprising a computer readable memory storing computer executable instructions thereon that when executed by a computer with channels that are not fully isolated performs the method steps described above.

In yet another embodiment, the present invention provides a computer with channels that are not fully isolated that performs the computer-implemented method described above for reducing undesired crosstalk signals on an inactive channel of the computer.

In a further embodiment, the present invention provides a computer-based audiometer with channels that are not fully isolated that performs the computer-implemented method described above for reducing undesired crosstalk signals on an inactive channel of the computer-based audiometer.

BRIEF DESCRIPTION OF THE DRAWINGS

FIG. 3 shows pseudocode to create 1 second of samples to produce a sine wave.

FIG. 4 is a graphical depiction of the affect of independently and collectively adjusting System Volume and Signal Amplitude.

FIG. 5 shows an example SystemVolumeAttenuation (SVA) table mapping System Volume to Audio Voltage Attenuation.

FIG. 6 shows pseudocode to find the required system volume level and signal amplitude for producing a sound at a given target attenuation.

FIG. 7 shows pseudocode to use the system volume level and Amplitude values from FIG. 6 to generate the waveform samples.

FIG. 10 displays an example Crosstalk Compensation Parameters (CCP) table.

DETAILED DESCRIPTION OF THE INVENTION

Figure 1:
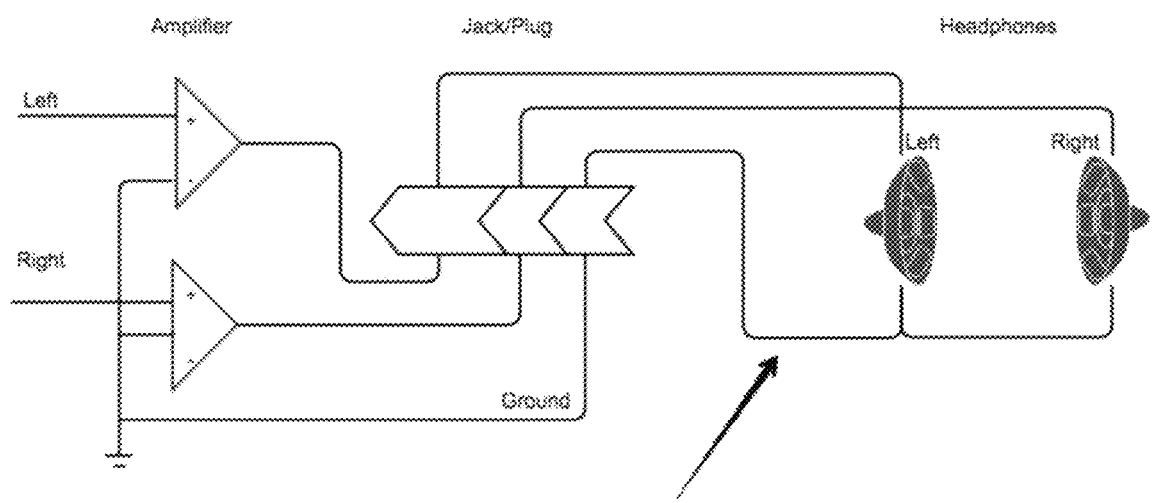
FIG. 1 is a graphical depiction showing crosstalk in a system where channels are not fully isolated.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

A crosstalk compensation system and method is disclosed for use in a computer-based audiometer. Crosstalk that couples between channels is reduced through use of a software module which modifies digital samples being sent to a digital-to-analog converter. The following definitions will assist in understanding the nature of the invention as described herein.

Definitions

Audiometer—A machine used for evaluating hearing loss.

Decibel (dB)—Used in audiometry when referring to sound levels. The decibel is a logarithmic unit that expresses the ratio of two values of a physical quantity. It is important to understand, for example, that a change in volume from 20 dB to 30 dB represents 10 times the power level, and a change from 20 dB to 40 dB represents 100 times the power level.

dB SPL—Sound Pressure Level (SPL): The local pressure, relative to a standard air pressure of 101.325 kPa (rms), caused by a sound wave. 0 dB SPL is defined as 20 uPa (rms) above this standard air pressure. A sound meter displays the "loudness" of a sound in dB SPL.

RETSPL—Reference Equivalent Threshold Sound Pressure Level. This is the minimum sound level (measured in dB SPL) that a normal person can detect. Audiometers need RETSPL values for each frequency being tested. RETSPL values are specific to each type of headphone and are published for common headphones.

dB HL—Hearing Level (HL). This unit is used to label the "volume control" knob on audiometers, and is also used on the Y-axis of an audiogram to denote the hearing thresholds of the patient. 0 dB HL represents the point at which the human ear can no longer hear the sound. The HL scale is frequency-specific, relates to dB SPL using frequency-specific RETSPL values for the headphones, and has the following relationship: dBHL=dbSPL−RETSPL.

ANSI/ASA S3.6-2010—The most recent specification for audiometers (see: http://webstore.ansi.org/RecordDetail.aspx? sku=ANSI %2FASA+S3.6-2010)

Relationship between RETSPL and dB HL—Unlike sound meters, the human ear is not equally sensitive to all sound frequencies. Thus 0 dB SPL (as read on a sound meter) does not represent "no sound" for a human ear. 0 dB HL is higher than 0 dB SPL but by an amount that varies by frequency. The number of decibels to add to 0 dB SPL to reach 0 dB HL is specific to the headphone used and the frequency. This is the RETSPL value for the frequency. RETSPL=dBSPL−dBHL.

Sine Wave—The sine wave or sinusoid is a mathematical curve that describes a smooth repetitive oscillation and is defined by:

$$a*\sin(\omega t+\text{phase})=a*\sin(2\pi ft+\text{phase})$$

where:
a=amplitude
ω=angular frequency=2π*f, where f is frequency t=time
phase=the phase, specifies (in radians) where in its cycle the oscillation is at t=0.

Active channel—The audio output channel presenting to the ear being tested.

Inactive channel—The audio output channel presenting to the ear that is not being tested (i.e. the channel where crosstalk manifests).

Amplitude (in the domain of sound)—the objective measurement of the degree of change (positive or negative) in atmospheric pressure (the compression and rarefaction of air molecules) caused by sound waves.

Attenuation—The decrease in amplitude of a signal. This is measured in decibels from the initial amplitude to the attenuated amplitude.

Sample—A value at a specific point in time. In the field of audiology this is referring to a calculated value of the sine wave at a given point in time.

Sample Rate—The number of samples of audio carried per second, measured in Hz.

System Volume Level—The audio output power level of the system (typically represented by a number between 0.0 and 1.0).

Audio Voltage (v)—The measured audio output in voltage.

Audio Voltage Attenuation (dB)—The audio channel voltage converted to attenuation in decibels relative to the maximum output voltage.

Signal on the active channel—The audio signal of specific frequency and amplitude that is produced on the audio channel that is connected to the patient ear under test.

Figure 8:
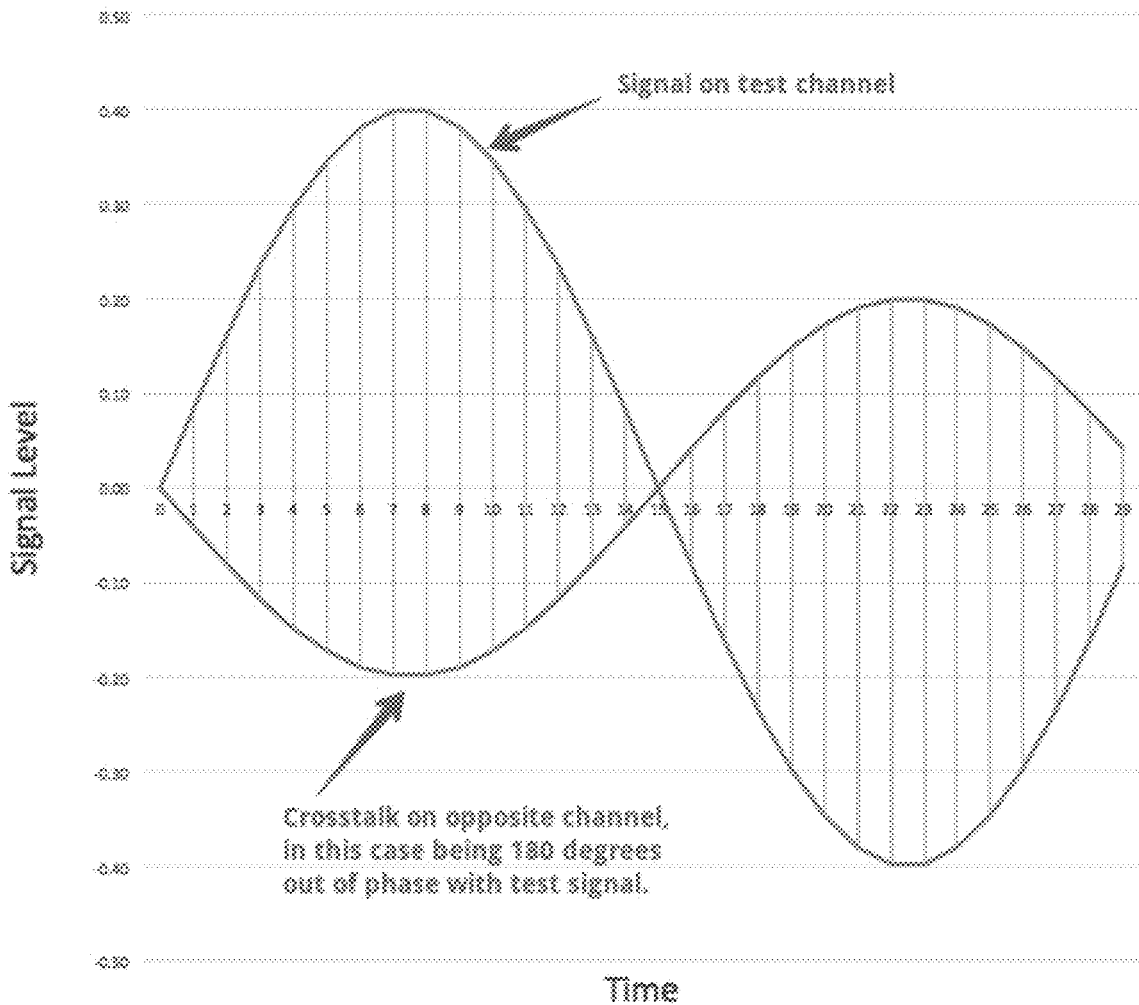
FIG. 8 is a graphical depiction of crosstalk.

Crosstalk Signal—The unwanted sound manifesting on the inactive channel. FIG. 8 shows a visualization of crosstalk manifesting at 180 degrees to the signal on the active channel.

Crosstalk Compensation Signal—The produced signal to cancel the crosstalk signal.

Crosstalk Compensation Parameters—The determined Crosstalk Amplitude Offset and Phase Offset which are used to generate a crosstalk compensation signal at a particular system volume level for a particular Nominal Impedance given the properties (amplitude, phase, frequency) of the signal being generated on the active channel.

Phase Offset—A number (in Radians) between 0 and 2 pi.

Crosstalk Amplitude Offset—The number of decibels by which to attenuate a copy of the active channel's signal (AmplitudeSignal) to create the crosstalk compensation signal (AmplitudeComp).

Nominal Impedance—The effective resistance (measured in Ohms) of a transducer.

Modules/Components

Sample Generator—Produces a stream of digital samples which are sent to a digital-to-analog converter. It is configured with various parameters which affect the characteristics of the output e.g. frequency, amplitude, and phase.

Calibration Parameters Lookup Module—A module, that for a specified frequency and signal attenuation, returns parameters with which the Sample Generator should be configured in order to produce the required output.

Two Channel Digital-to-Analog Converter—A hardware component of the computer-based audiometer which consumes digital data and produces audio output (typically called a DAC).

Simplifications for Illustrative Purposes

For the purpose of making the method of the present invention more clear, we will remove certain complicating factors that are not part of the core innovation:

1) We Will Only Use dB SPL, not dB HL in Algorithms.

In the domain of audiometers, the reader who is skilled in the art will recognize that the dB HL unit is easily calculated from the dB SPL value by simply subtracting the RETSPL value for the headphones. For describing how to eliminate crosstalk however, this conversion complicates the description unnecessarily. We will note that it can also be more convenient in an audiometer implementation to use dB HL for indexing into several of the data structures described in this disclosure, and this is an obvious modification that can be made to the data structures that we describe.

2) We Will Exclude Headphone-Specific Offsets in Algorithms.

In the domain of sound generation, each headphone of a specific model responds slightly differently to input power, so for audiometers a calibration process is followed to find a compensation factor for each headphone. We will describe the relevant portion of headphone calibration for background information, however for algorithm clarity, we will assume this compensation factor is 0 when describing how to compensate for crosstalk. A reader skilled in the art will know that any final output value calculated from the simplified algorithms described in this disclosure will need to be shifted up or down by the "tuning" compensation value specific to each headphone used.

Procedure to Generate a Tone

First, the person skilled in the art will need to become familiar with the procedure to generate a simple sine wave signal at a specified frequency and phase. Each sine wave sample (at time 't') is produced by using the following formula:

$$a*\sin(2\pi ft+\text{phase}).$$

The frequency (f) and amplitude (a) remain fixed. When digitally generating a sine wave, the time (t) is quantized into intervals called samples. Only the time (t) variable changes for each sample point along the length of the wave. In the above formula, t is replaced by an interval-dependent time by defining time as time=frequency/sample_rate*interval. So, for example, if the frequency is 1 Hz and the sample rate is 30 per second, then 30 samples are needed for 1 second of sound. When finding the 5th (index 4) of the 30 samples (numbered 0 to 29), we would thus set t=1/30*4.

The system of the present invention is designed to use an "audio output framework" typically provided by either the computer's operating system (OS) or a sound generation library. The audio output framework requires a set of samples in an array-like structure and it takes care of producing an audible analogue audio signal from the provided samples. Audio Output Frameworks vary in their methods of requesting and filling the audio sample buffers however. For example, some audio output frameworks poll the application when the sample buffer requires more data, while others rely on the application to actively send new samples on a regular basis. The same system for creating the buffer applies in either case however.

The pseudocode shown at FIG. 3 creates an array of samples to pass to the operating system to produce a sine wave. Variables that control the maximum amplitude and frequency of the waveform are controlled outside of the loop. The loop itself iterates, at a calculated interval (ie. sample rate), over one full sine wave cycle.

Figure 2:
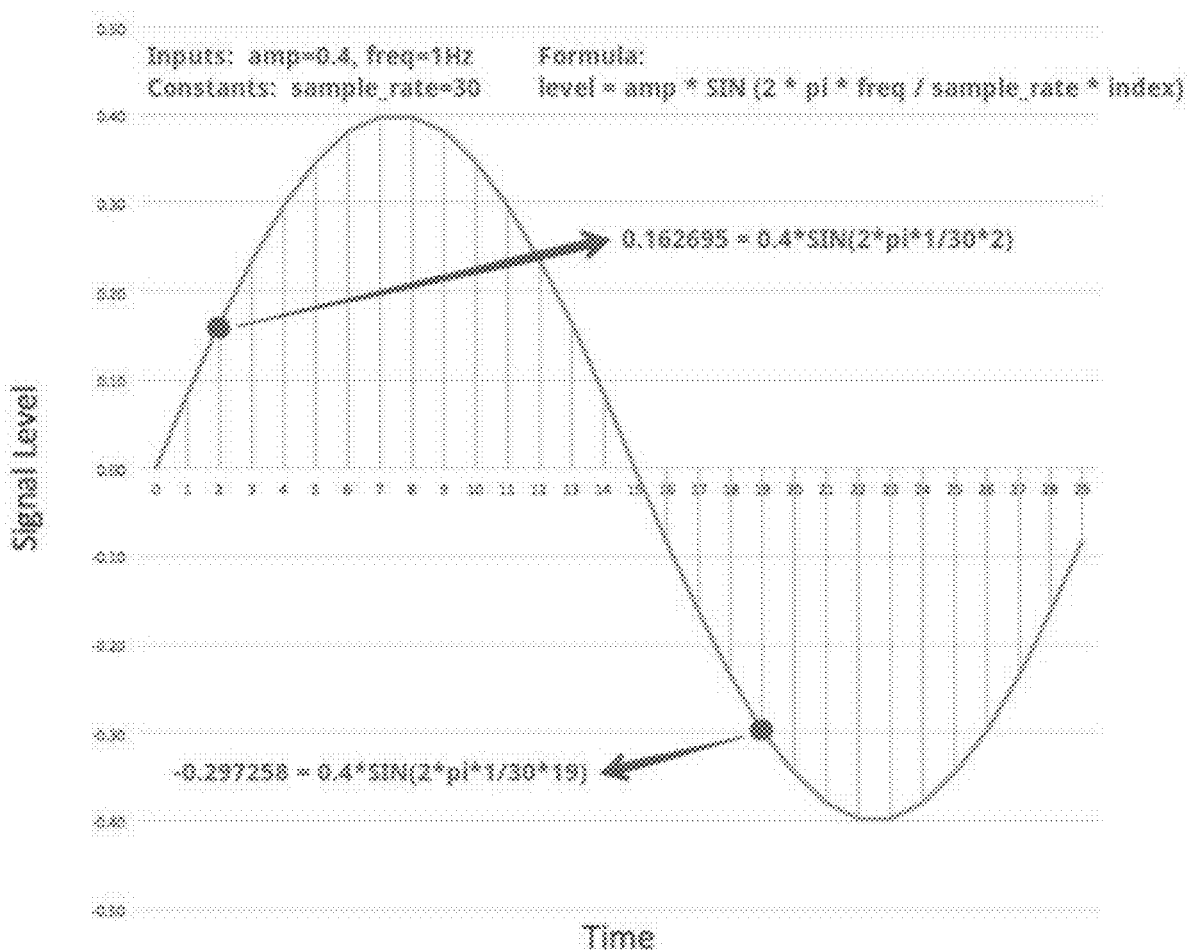
FIG. 2 is a graphical depiction of a sine wave where the amplitude is set to 0.4 and the frequency is set to 1 Hz.

If we were to prepare a graph using the algorithm at FIG. 3 (in this case setting the frequency to 1 Hz, the amplitude to 0.4, and the sample rate to 30 per second) the wave as shown at FIG. 2 is generated.

For most applications you would not use a sample rate as low as 30 Hz of course. A digital audio sample rate of 44.1 kHz is more typical and so requires 44100 samples to be calculated for generating 1 second of sound.

Procedure to Produce an Accurate Volume Level

As a prerequisite to describing the process for eliminating the cross-talk signal on the inactive channel, it is necessary to first describe how the system generates tones in a way that achieves an accurate volume level for each frequency on the Active Channel.

In any programmable computer device capable of generating sound, there are usually two factors which combine to produce the resulting sound. The first factor is the Signal Level—this is the amplitude ('a') of the waveform generated or played by the software. The second factor is the System volume level—this is the hardware "volume control" ('v') of the device which physically amplifies or dampens the signal.

The most straight-forward way to calibrate output levels is to build a table that maps the desired output level (db SPL) to the required levels of each of the 2 input factors noted above. It is apparent that for any desired sound output level, there are many possible combinations of the two inputs that can produce the desired output level.

The skilled person might consider always leaving the System volume level at some fixed level and only varying the signal level between 0 and 1. However, the skilled person would likely find that they can't achieve the desired volume range. For instance, with the signal level at 0, there typically exists a maximum System Volume Level beyond which ground noise (ie. "hiss") from the amplifier will be heard by the listener. Likewise, with the signal level at 1, there exists a minimum system volume level that is capable of producing a loud enough output. For this reason, it is typically required to use more than 1 system volume level to achieve the full range of volume while minimizing ground noise. This is depicted in FIG. 4.

In the domain of audiometers, it is desirable to be able to achieve the loudest possible sound, necessitating that the first of the selected System Volume Levels be 1.0 (representing maximum amplification). Audiometers are also required to produce very quiet sounds, but using the maximum volume level yields an unacceptably high noise floor for this use-case, so a second lower System Volume Level is usually required. This enables production of very quiet sounds free of unwanted noise. It is recommended to use the highest System Volume Level that does not produce any audible hiss when the signal is off, so that the lower volume level can be used for the most commonly used quiet and medium volume sounds. For audiometer applications, using only these two selected System Volume levels is usually all that is required, however the system described in this application is not limited to two levels.

To produce the desired output volume level, first choose the lowest level from the selected System Volume Levels that would produce a sound louder than the target SPL if the signal amplitude was set to 1.0. Then reduce the signal amplitude by the amount required to produce the desired sound level.

Process of Building a Table for the System Volume Levels

When using typical consumer hardware, the exact effect of adjusting the system volume level is not known ahead of time.

In order to have a method of producing accurate volume levels, we need to first create a mapping of decibel levels to system volume levels. Since decibels are a measure of 10× change, there is no way to describe the change if starting at 0. Instead we must describe the change in decibels relative to the loudest possible output and work downwards. Everything is always based from the maximum possible output, which is why the table we will build starts from the maximum output and works downwards.

We need to build a table to store the decibels of attenuation (relative to maximum output) that are caused by each selected System Volume Level, and start by performing some measurements as follows.

First, set the System Volume Level to the maximum level, generate a sine wave with amplitude 1.0, and measure the resulting output voltage (V rms). This "maximum_voltage" as measured is required to calculate the attenuation of the remaining System Volume Levels.

Next, for each of the other selected System Volume Levels, set the System Volume Level to the chosen level, generate a sine wave with amplitude 1.0, and measure the resulting output, "test_voltage" (V rms).

With the measured voltages in hand, next we must convert these to decibels of attenuation caused by each System Volume Level, and it is this mapping that we store in a table.

The maximum System Volume Level is, by definition, an attenuation of 0 dB. Each lower volume level is measured relative to this.

Convert the voltage readings into decibels with this formula:

$$dB=20\times Log(test\_voltage/maximum\_voltage)$$

In the example shown in FIG. 5, the values were measured across a 50 ohm load using a Wavetek 27XT volt meter, and are shown in the table mapping System Volume Level to Audio Voltage Attenuation, which we'll call "SystemVolumeAttenuation" (or SVA for short). The Audio Voltage Attenuation is measured in dB and is a measure of the change in voltage from the maximum possible output.

It is important to remember that the table at FIG. 5 refers to how the system volume control affects the output voltage level. This will produce different sound output for different headphones, so measurements of each headphone are required to determine the resulting sound pressure (measured in dB SPL) for each entry in the SVA table. This "calibration" step is discussed in the next section.

The table at FIG. 5 provides sufficient information to know the effect on output voltage for each noted Volume Level when the signal amplitude is 1.0, but is necessary to also attenuate the signal (ie. reduce the amplitude below 1) in order to produce all desired outputs. This is described more in the next section.

The graph at FIG. 4 illustrates how, in isolation, neither the system volume level attenuation nor signal level attenuation would provide enough range, but when combining them together will allow the application to achieve a high signal to noise ratio (ie. avoiding "speaker hiss") over a large range.

It is important to observe that the "v+a" line has the largest decibel range of the 3 lines. It can therefore produce very quiet sounds (bottom-left), while still being able to produce very loud sounds (top-right).

Headphone Calibration

Recall that the system volume levels were measured electrically without a transducer attached. However to use the SystemVolumeAttenuation table to produce physical sound levels measured in decibels of Sound Pressure Level (dB SPL), we must know the maximum sound output of the attached headphone. Measuring this value is a key part of the calibration process. In a typical audiometer implementation, a person skilled in the art would measure the maximum output ('maxSPL') for a particular pair of headphones for each of the left and right channels at various signal frequencies (typically between 125 Hz and 16 KHz) using a sound meter, and then store the measured values. With this knowledge the target attenuation can be calculated by using the following formula:

$$targetAttenuation=targetSPL-maxSPL$$

For example, if the maximum sound pressure level is 115 dB SPL for a specific headphone channel at 1 KHz, and you want to produce a sound at 70 dB SPL, the targetAttenuation is −45 dB.

Skilled persons will appreciate that other variants of this step can be done, for instance, instead of calibrating by reading the maximum output of the transducer, it is very common to measure at a lower level of output, and then calculate the maximum output by assuming perfect linearity.

Other methods may not store the maxSPL, but instead use a globally defined best guess for maxSPL, and then only store an "adjustment" value from that maxSPL for each headphone.

Process of Adjusting the Signal Level

In order to produce a sound for a given targetAttenuation, the application needs to select the required system volume level and then calculate the required signal attenuation.

To find the required System Volume Level, we iterate through the SVA table (as shown at FIG. 5) to find the Audio Voltage Attenuation value that would attenuate the output as much as possible, but not more than the targetAttenuation. Once the corresponding System Volume Level has been read from the table, we must calculate how much more attenuation is still required to achieve the targetAttenuation.

For example, if the targetAttenuation is −45 dB, the application would use the lookup table to find the lowest system volume level that attenuates by not more than −45 dB. Using the table at FIG. 5 we would therefore choose 0.56 as the System Volume Level which attenuates by −25.17 dB. Therefore we must also attenuate the signal by −19.83 dB to reach the targetAttenuation.

The formula to calculate Signal Attenuation is therefore:

$$Signal\ attenuation\ (dB)=Target\ Attenuation\ (dB)-Audio\ Voltage\ Attenuation\ (dB)$$

The required Signal Attenuation then needs to be converted from decibels into Amplitude in order for us to use this value to adjust the sine wave (which has an amplitude value between 0 and 1).

The following well-known formula does this conversion:

$$Amplitude=10^{\wedge}(Decibels/20)$$

We can provide this in a convenient function as follows:

```
func decibelstoAmplitude(dB) {
    return pow(10, dB/20)
}
```

Therefore by the above formula, −19.83 dB translates to a signal Amplitude of 0.1019 which must be used along with a system volume of 0.56 to produce −45 dB of attenuation.

Combining all of the above concepts, we can now describe a method to find both the required system volume level and calculate the required signal amplitude for any requested target attenuation (see the pseudocode at FIG. 6).

The next step is to use the two values returned by the function shown at FIG. 6 (systemVolumeLevel and amplitude) to generate the sound. This is accomplished by simply filling an array with values that describe the sine wave using the amplitude that we have just calculated (see the pseudocode at FIG. 7). The "sample" array now contains the data required to pass to the sound generation module.

Crosstalk Compensation Method

With an understanding of the above-described sound-generation system, we can now describe how to compensate for crosstalk.

The following describes a system of compensating for predictable crosstalk. First we will show how to determine and store the correct values to generate a crosstalk compensation signal on the inactive channel. Then we will show how to use those stored values to generate a crosstalk signal. Finally, we will combine all of the concepts to show how to generate both the signal on the active channel and the crosstalk compensation signal on the inactive channel simultaneously.

To minimize the number of Crosstalk Compensation Parameters it is desirable to minimize the number of selected System Volume Levels because a separate set of Crosstalk Compensation Parameters is required for each System Volume Level.

As mentioned, crosstalk is hardware-dependent, not only on each amplifier design, but also on each selected System Volume Level, the impedance of the driving channel of the headphone being used, and the frequency and phase of the signal. The person skilled in the art will be able to use the methods described in this disclosure to account for any additional system-dependent factors that are found to affect crosstalk in the system.

Determining and Storing the Crosstalk Compensation Parameters

The following steps must be repeated for each headphone impedance that is needed in the final system.

The first step is to generate a signal on the active channel. For each System Volume Level chosen in FIG. 5, with a chosen set of headphones (with a noted impedance) generate a sine-wave tone at any chosen frequency and amplitude. Unless distortion interferes with the measurements, it may be easiest to choose the maximum amplitude of 1.0 for this.

The second step is to measure how much crosstalk is present on the inactive channel using a sound meter. With no compensation system in place, you will see a significant level of crosstalk present.

The third step is to generate a candidate crosstalk compensation signal. Note that we can only adjust the amplitude and phase since the System Volume Level must not be adjusted since it would affect the signal on the active channel.

The CrosstalkAmplitudeOffset is the number of decibels by which to attenuate a copy of the active channel's signal (AmplitudeSignal) to create the crosstalk compensation signal (AmplitudeComp). The formula is:

AmplitudeComp=AmplitudeSignal+CrosstalkAmplitudeOffset

For our continuing example of producing a signal on the active channel at −45 dB (assume 125 Hz for this example) and using the CPP table in FIG. 10, we can determine the amplitude of the compensation signal as:

−77.38 dB=−19.83 dB+−57.55 dB

Similarly, we relate the phase of the crosstalk compensation signal "PhaseComp" to the phase of the signal on the active channel "PhaseSignal" as follows:

PhaseComp=PhaseSignal+PhaseOffset

The "Phase Offset" is a number (in Radians) between 0 and 2 pi read from FIG. 10. In our example, the phase of the signal is 0 Radians so the phase of the compensation signal is:

3.142=0+3.142

Figure 9:
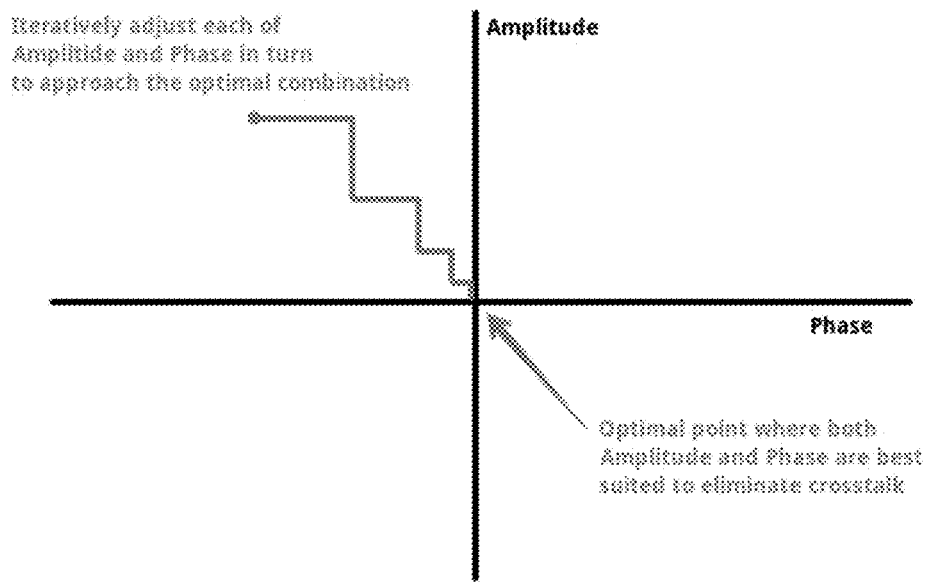
FIG. 9 displays a method to determine crosstalk compensation parameters.

For a given headphone impedance, these 2 "Crosstalk Compensation Parameters" remain constant for any given System Volume Level and Frequency regardless of the amplitude or phase of the signal on the active channel. If the "Phase Offset" is known for a particular frequency, its value can easily be calculated for any other frequency since Phase Offset doubles with each increase in octave, and halves with each decrease in octave (Crosstalk Amplitude Offset is not affected by frequency). The values for a chosen frequency can readily be discovered by iteratively approaching the optimal combination of values as shown in FIG. 9. A sound meter can be used to read the strength of the crosstalk signal. Adjust both of the Crosstalk Compensation Parameters until the crosstalk shown on the sound meter is minimized.

Once determined, the Crosstalk Compensation Parameters can be stored in a table such as depicted in FIG. 10.

Crosstalk Signal Generation

It will be apparent to one skilled in the art that the CCP table (FIG. 10) can now be directly queried to find the Crosstalk Amplitude Offset and Phase Offset needed to produce the crosstalk compensation signal. The amplitude and phase required for generating the crosstalk-compensation signal (AmplitudeComp and PhaseComp) can then be calculated as shown in FIG. 10.

Given AmplitudeComp and PhaseComp, the crosstalk compensation signal samples can then be generated for the inactive channel using the same process by which samples are generated on the active channel. This is shown in FIG. 3.

Simultaneous Signal Generation on Active and Inactive Channels

Figure 11:
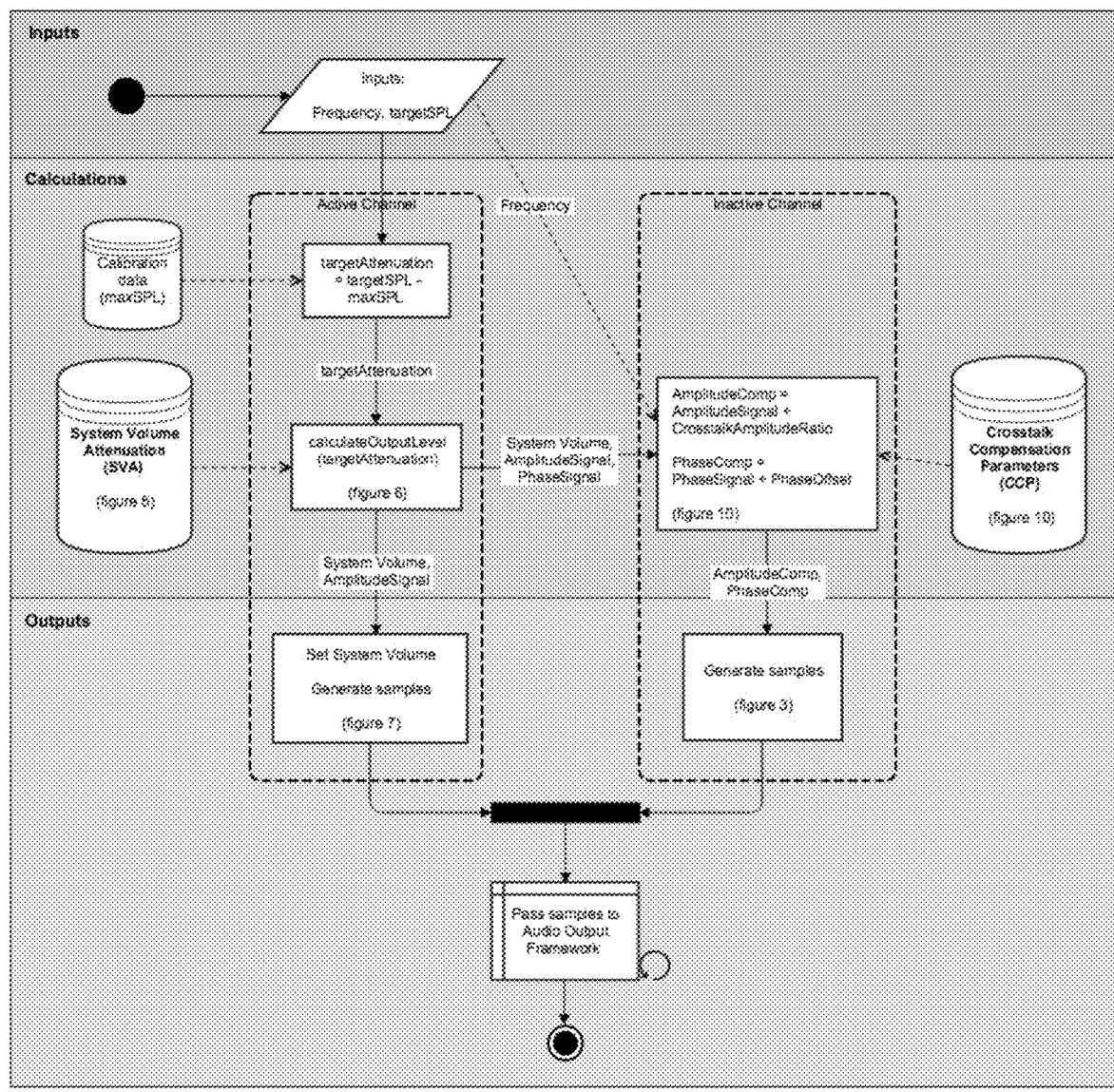
FIG. 11 displays a flowchart outlining steps for producing a crosstalk compensation signal.

The crosstalk signal must of necessity be generated simultaneously to the active channel's signal. The signal on the active channel and crosstalk compensation signal should preferably be produced by the same code module which sends two channel samples to audio hardware, so that there is a high degree of accuracy to the time synchronization between the two channels. This is simply a matter of combining the concepts discussed above. The flowchart at FIG. 11 illustrates the overall steps required for producing both the active channel's signal and the crosstalk compensation signal simultaneously. The chart can be divided into three sections: getting Inputs, finding the required system volume and signal levels (Calculations) and finally producing the samples (Outputs).

Although specific embodiments of the invention have been described, it will be apparent to one skilled in the art that variations and modifications to the embodiments may be made within the scope of the following claims.

We claim:

1. A computer-implemented method for reducing undesired crosstalk signals on an inactive channel of a device comprising the steps of:
   (a) determining system volume levels required to achieve a range of desired audio output attenuation levels on an active channel of the device, wherein the determining system volume levels required to achieve the range of desired audio output attenuation levels on the active channel of the device comprises: (i) measuring an output level at each system volume level of the device when signal amplitude is set at 1;
   (ii) converting the output level at each such system volume level into decibels of attenuation, and (iii) storing the decibels of attenuation for each system volume level in a database:
   (b) determining a crosstalk compensation signal comprising a signal amplitude and associated phase shift required to reduce undesired crosstalk on the inactive channel of the device for each desired audio output attention level in the range of desired audio output attenuation levels, wherein the determining the crosstalk compensation signal comprising the signal amplitude and associated phase shift required to reduce undesired crosstalk on the inactive channel of the device for each desired audio output attention level in the range of desired audio output attenuation levels comprises:
(i) generating a tone for the desired audio output attenuation level by controlling and setting the system volume level required to generate said tone a
(ii) measuring the undesired crosstalk on the inactive channel of the device;
(iii) selecting an initial Crosstalk Amplitude Offset and Phase Offset that would generate a signal equal in amplitude and opposite in phase to the measured crosstalk at the system volume level;
(iv) re-measuring the undesired crosstalk on the inactive channel of the device and iteratively adjusting the Crosstalk Amplitude Offset and Phase Offset until the re-measured undesired crosstalk is minimized; and
(v) storing the Crosstalk Amplitude Offset and Phase Offset that resulted in the minimized re-measured undesired crosstalk in a database; and
(c) generating a desired audio output attenuation level on the active channel of the device by generating a signal at the determined system volume level required to achieve said desired audio output attenuation level and generating a contemporaneous crosstalk compensation signal on the inactive channel of the device by generating a signal at the determined signal amplitude and associated phase shift required to reduce the undesired crosstalk on the inactive channel.

2. The computer-implemented method of claim 1 wherein the step of generating the desired audio output attenuation level on the active channel of the device comprises querying the database for the system volume level to use, and the step of generating the contemporaneous crosstalk compensation signal on the inactive channel of the device comprises querying the database for the Crosstalk Amplitude Offset and Phase Offset required to generate said crosstalk compensation signal.

3. The computer-implemented method of claim 2 wherein the database that is queried for the Crosstalk Amplitude Offset and Phase Offset is indexed by impedance value of the active channel.

4. The computer-implemented method of claim 3 wherein the step of generating the contemporaneous crosstalk compensation signal comprises interpolating between impedance values to determine an appropriate Crosstalk Amplitude Offset and Phase.

5. The computer-implemented method of claim 3 wherein the step of generating the contemporaneous crosstalk compensation signal on the inactive channel of the device comprises querying the database for the Crosstalk Amplitude Offset and Phase Offset for a particular frequency, and then doubling or halving the Phase Offset for each octave deviance from the frequency.

6. The computer-implemented method of claim 5 wherein the device is a computer-based audiometer having channels that are not fully isolated.

7. A computer-readable medium device storing computer executable instructions thereon that, when executed by a computer with channels that are not fully isolated, cause the computer to perform the method steps of claim 5.

8. A computer with channels that are not fully isolated that performs the computer-implemented method of claim 5 for reducing undesired crosstalk signals on an inactive channel of the computer.

9. A computer-based audiometer with channels that are not fully isolated that performs the computer-implemented method of claim 5 for reducing undesired crosstalk signals on an inactive channel of the computer-based audiometer.

10. The computer-implemented method of claim 1 wherein the device is a computer-based audiometer having channels that are not fully isolated.

11. A computer-readable medium device storing computer executable instructions thereon that, when executed by a computer with channels that are not fully isolated, cause the computer to perform the method steps of claim 1.

12. A computer with channels that are not fully isolated that performs the computer-implemented method of claim 1 for reducing undesired crosstalk signals on an inactive channel of the computer.

13. A computer-based audiometer with channels that are not fully isolated that performs the computer-implemented method of claim 1 for reducing undesired crosstalk signals on an inactive channel of the computer-based audiometer.

* * * * *